W. L. HARDING.
NUT LOCK.
APPLICATION FILED SEPT. 4, 1915.
1,179,305.
Patented Apr. 11, 1916.
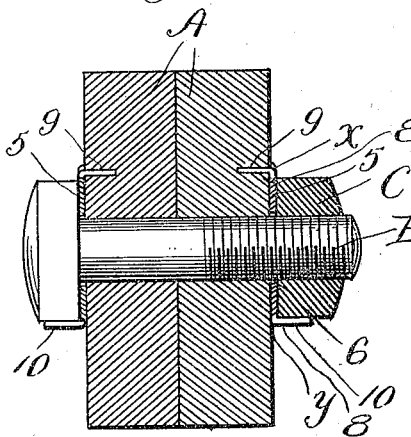
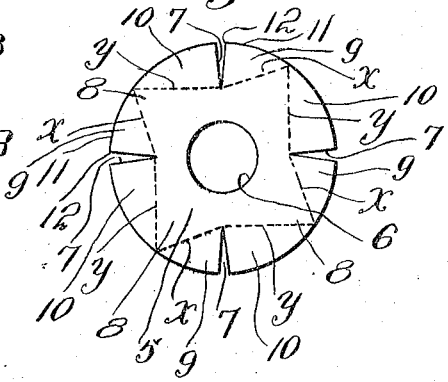
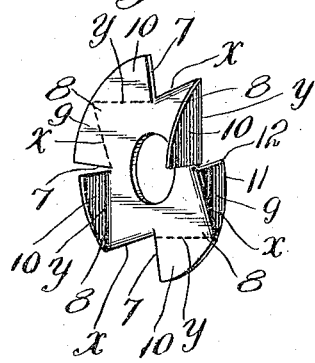
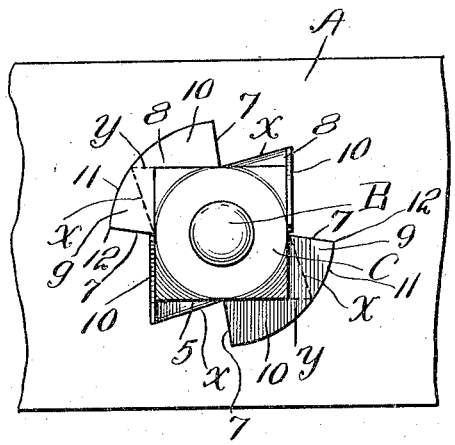
Inventor
W. L. Harding
By Victor J. Evans
Attorney
Witnesses

UNITED STATES PATENT OFFICE.

WALTER L. HARDING, OF PHARR, TEXAS.

NUT-LOCK.

1,179,305. Specification of Letters Patent. Patented Apr. 11, 1916.

Application filed September 4, 1915. Serial No. 49,070.

*To all whom it may concern:*

Be it known that I, WALTER L. HARDING, a citizen of the United States, residing at Pharr, in the county of Hidalgo and State of Texas, have invented new and useful Improvements in Nut-Locks, of which the following is a specification.

The present invention contemplates the provision of a nut lock, in the nature of a washer or plate divided on predetermined lines to provide identical portions, each of which is adapted to be bent to provide an attaching spur to be driven into an object or support, and a reversely disposed nut engaging portion.

The invention will be better understood from the following description when taken in connection with the accompanying drawing wherein the specific construction and arrangement of parts are clearly illustrated and fully described in detail.

In the drawing forming part of this application like numerals of reference indicate similar parts in the several views and wherein:—Figure 1 is a longitudinal sectional view through a bolt and nut showing the device forming the subject matter of my invention in applied position. Fig. 2 is a plan view of the washer. Fig. 3 is a perspective view thereof.

Referring more particularly to the drawing A indicates the material through which the bolt B extends, and C the nut.

The device forming the subject matter of my invention is in the nature of a metallic washer or plate 5 preferably of circular contour, having the usual opening 6 to permit the latter to be positioned upon the bolt between the material through which the latter extends and the nut C. The washer is stamped on radial lines to provide substantially V-shaped slits 7 diametrically opposed and extending in the direction of the opening 6. Obviously the V-shaped slits 7 divide the washer into identical portions or sectors 8 which are intended to be bent along the line $x$ to provide an attaching prong 9 and along the line $y$ to provide a reversely disposed nut engaging portion 10.

In arranging the washer in position for use, the same is first arranged upon the bolt to rest upon the material A, and the prongs 9 subsequently driven into the material, the curved portion 11 at its point of juncture with the straight edge of each sector defining a sharp point 12 to permit the prongs to be readily and easily embedded in the material A. The nut C is then properly adjusted upon the nut B and the remaining portion 10 of each sector bent upwardly, or in a reverse direction with relation to the prongs 9 into engagement with the opposite sides of the nut, whereby both the latter and washer are effectively held against retrograde movement about the bolt.

If desired only certain of the sectors 8 may be bent to provide the attaching prongs 9 and the remaining sectors bent into engagement with the opposite sides of the nut, this of course wholly depending upon the size of the nut to be retained upon the bolt, and just how effectively it is desired to have the washer secured to the material A through which the bolt extends. It is to be further understood that the washer may be constructed from any suitable material and of any desired dimension, and that various changes in its make-up may be resorted to when desired as fall within the scope of the appended claims.

What is claimed is:—

1. A nut lock comprising a washer divided on predetermined lines to provide identical sector-like portions, each portion being bent upon a substantially V-shaped fold line to provide an attaching support, and a reversely disposed nut engaging portion.

2. A nut lock comprising a washer divided on predetermined lines to provide identical sector-like portions, each of which being adapted to be bent in reverse directions upon a substantially V-shaped fold line, to provide an attaching spur and a nut engaging portion, and each of said portions of the respective sectors having a curved edge and a straight edge defining a sharp point at the juncture of said edges to permit the said spurs to be embedded in the material through which the bolt is passed.

3. A nut lock comprising a circular washer having a central opening, and radially extending V-shaped slits extending from adjacent said opening to the edge of the washer, and defining identical sector-like portions, each of said portions being bent upon a substantially V-shaped fold line to provide an attaching spur, and a reversely disposed nut engaging portion disposed at right angles to the body of the washer.

In testimony whereof I affix my signature in presence of two witnesses.

WALTER L. HARDING.

Witnesses:
J. J. DEVOTI,
W. C. HODGE.

Copies of this patent may be obtained for five cents each, by addressing the "Commissioner of Patents, Washington, D. C."